I. H. OLSON, T. A. ROREM & J. H. HILL.
BRUSH CUTTER.
APPLICATION FILED JULY 30, 1912.
1,063,176. Patented May 27, 1913.
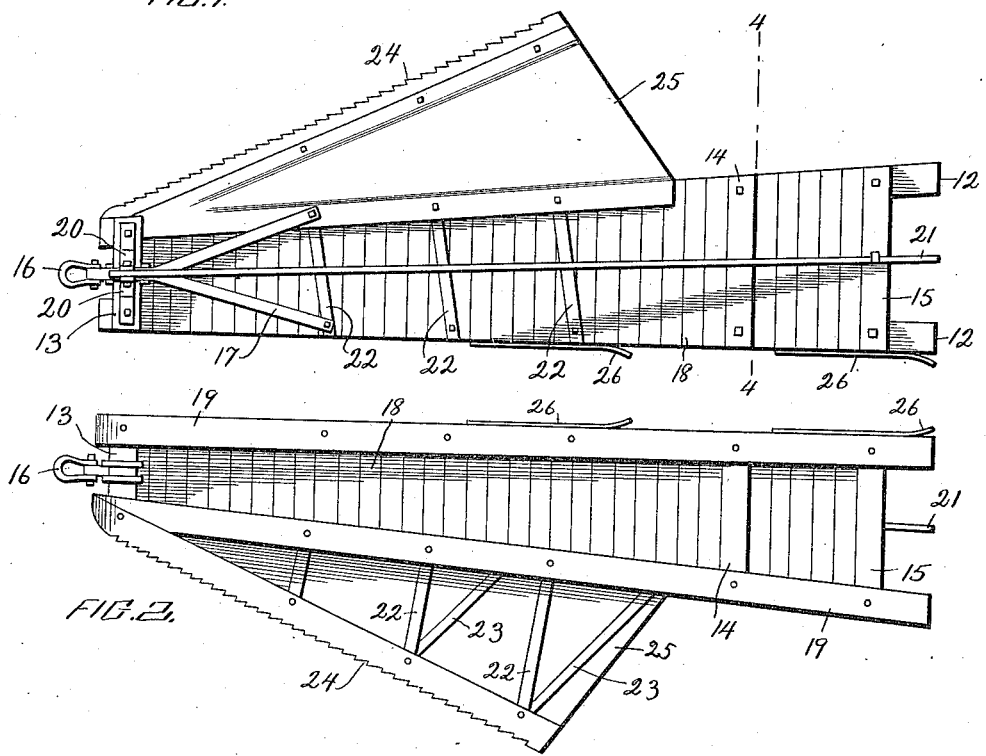
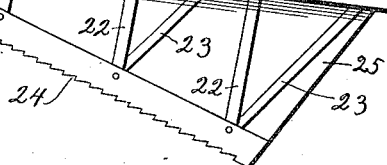
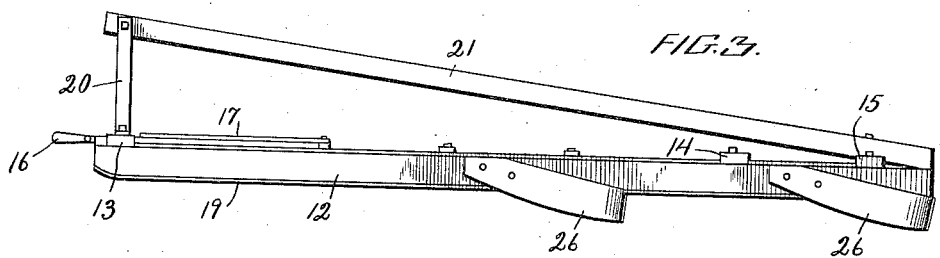

UNITED STATES PATENT OFFICE.

INGEBRIGH H. OLSON, THOMAS A. ROREM, AND JOHN H. HILL, OF TOFIELD, ALBERTA, CANADA, ASSIGNORS OF ONE-FOURTH TO JOHN CORMACK AND HENRY ARTHUR MACKIE, BOTH OF EDMONTON, CANADA.

BRUSH-CUTTER.

1,063,176.  Specification of Letters Patent.  Patented May 27, 1913.

Application filed July 30, 1912.  Serial No. 712,359.

*To all whom it may concern:*

Be it known that we, INGEBRIGH H. OLSON, THOMAS A. ROREM, and JOHN H. HILL, all citizens of Canada, and residing at Tofield, in the Province of Alberta, Dominion of Canada, have invented or discovered certain new and useful Improvements in Brush-Cutters, of which the following is a specification, reference being had therein to the accompanying drawings.

This invention has for its object to provide an efficient brush cutter in the form of a drag or sled which may be drawn along on the ground and which is provided with a saw-toothed cutting blade which is inclined relative to the path of movement of the cutter so that it will serve to cut off brush or small trees close to the surface of the ground, in clearing land. For the purpose of counteracting the tendency of the cutting device to be forced laterally by the resistance offered to the cutting blade, the frame carrying the latter is provided at its side opposite to the said blade with one or more vertically disposed guiding blades which will be forced, by the weight of the cutter, into the ground, so as to hold the cutting blade up to its work.

In the accompanying drawing Figure 1 is a plan view of the improved brush cutter; Fig. 2 is a bottom view, and Fig. 3 is a side view of the same. Fig. 4 is a transverse section on line 4—4, Fig. 1.

Referring to the drawing, the frame of the cutter comprises two longitudinal beams or stringers 12 which are preferably slightly inclined relative to each other so as to converge toward each other at their forward ends, as more clearly shown in Fig. 2. The beams 12 are connected together by cross bars 13, 14 and 15, and a suitable clevis 16, to which the traction power may be applied is attached to a forked bar 17, which is suitably bolted to the frame of the cutter. The space between the cross-bars 13, 14 and 15 will preferably be filled by boarding 18 nailed or otherwise suitably attached to the longitudinal beams 12, the said beams 12 being preferably shod with steel plates 19. The forward ends of the beams 12 are preferably slightly upwardly inclined, somewhat in the form of sled runners. Attached to the forward cross bar 13 are two uprights 20 which support between them a longitudinal back bone bar 21 the rear end of which is rigidly secured to the rear cross bar 15, the said back bone bar being preferably centrally disposed, relative to the longitudinal beams 12, and being downwardly inclined rearwardly from its forward end.

Supported by suitable braces 22 and 23, bolted to the longitudinal beams 12, is a cutting blade 24 having a serrated or saw-toothed cutting edge, the said blade being arranged in an angular position, relative to the longitudinal beams or to the framework of the cutter, so as to present a cutting edge which will be inclined at an acute angle to the path of travel of the cutting drag. The space between the blade or cutter 24 and the proximate longitudinal beam 12 is preferably filled by a sheet metal plate 25, which is inclined downward outwardly from the upper side of the frame of the drag and which overlies the braces 22 and 23, so as to present a smooth surface which will prevent the falling brush from catching on the said braces and the frame work of the drag, and which will also, by reason of its being inclined, tend to discharge the falling brush. The rearwardly inclined back bone bar 21 will also serve as a guard to prevent the falling brush from catching on the drag. Owing to the fact that said bar or guard has its forward end highest, so that it slants downward rearwardly, the brush falling thereon will be readily discharged from the drag as the latter is drawn forward.

By reference to Figs. 1 and 2 it will be seen that the plate 25 is secured at one edge to the body of the drag, and at its opposite edge to the braces 22 and 23, and also to the blade or cutter 24 by the pins or bolts by which said braces are attached to the body of the drag and also by which the blade or cutter is attached to said braces. The said plate, therefore, serves to brace and steady the said plate or cutter, as well as to act as a guard to prevent the falling brush from catching on the braces.

To resist the tendency of the drag to move sidewise, in opposition to the thrust of the cutting blade 24, the said drag is provided at its side opposite the said cutting blade with one or more vertically disposed blades or knives 26 which extend below the bottom of said drag so that they may dig into the ground and thus offer a resistance to a tendency of the drag to move sidewise, and will thus serve to guide the drag or cutter properly. To assist in such guiding action the rear ends of said blades are preferably turned outward slightly, as shown in Fig. 2, the said blades being rigidly bolted to one of the beams 12.

The brush cutter will preferably be operated by a traction engine connected to the clevis 16, but it may be drawn, for the brush cutting operations, by draft animals, as well.

The operation of the improved cutter will be readily understood from the foregoing. As the drag is drawn forward along the ground the serrated cutting blade 24 will engage the brush or small trees and will cut the same off close to the ground, so as to clear the latter in readiness for plowing.

Having thus described our invention we claim and desire to secure by Letters Patent:

1. A brush cutting drag comprising a body framework provided with means whereby traction power may be applied thereto, a series of braces extending outward from one side of said framework, a brush cutter mounted at the outer ends of said braces and disposed at an acute angle to the body of the drag, a plate attached to said body and to said braces and cutter, said plate overlying said braces and filling the space between the said cutter and the body of said drag, and means for resisting the side thrust of said cutter to prevent lateral movement of the drag under the influence of such thrust.

2. A brush cutting drag comprising a body provided with means whereby traction power may be applied thereto, a brush cutter connected with one side of said body, but extended outward therefrom at an acute angle thereto, and guiding blades projecting below said body on the side thereof opposite said cutter, and serving to oppose the thrust of the latter so as to prevent sidewise movement of the drag as it is drawn forward, the rear ends of said guiding blades being turned outwardly to increase their thrust-resisting action.

3. A brush cutting drag comprising a body provided with means whereby traction power may be applied thereto, a brush cutter connected with one side of said body, but extended outward therefrom at an acute angle thereto, an inclined guard centrally disposed above the body of the drag and having its forward end highest so that it slants downward rearwardly, and means for resisting the thrust of the said cutter to prevent lateral movement of the drag under the influence of such thrust.

In testimony whereof we affix our signatures, in presence of two witnesses.

INGEBRIGH H. OLSON.
THOMAS A. ROREM.
JOHN H. HILL.

Witnesses:
B. M. BENDIKSEN,
I. C. OLSON.

---

Copies of this patent may be obtained for five cents each, by addressing the "Commissioner of Patents, Washington, D. C."